Dec. 17, 1935.  C. C. FARMER  2,024,687
ELECTROPNEUMATIC BRAKE
Filed July 7, 1934   3 Sheets-Sheet 1
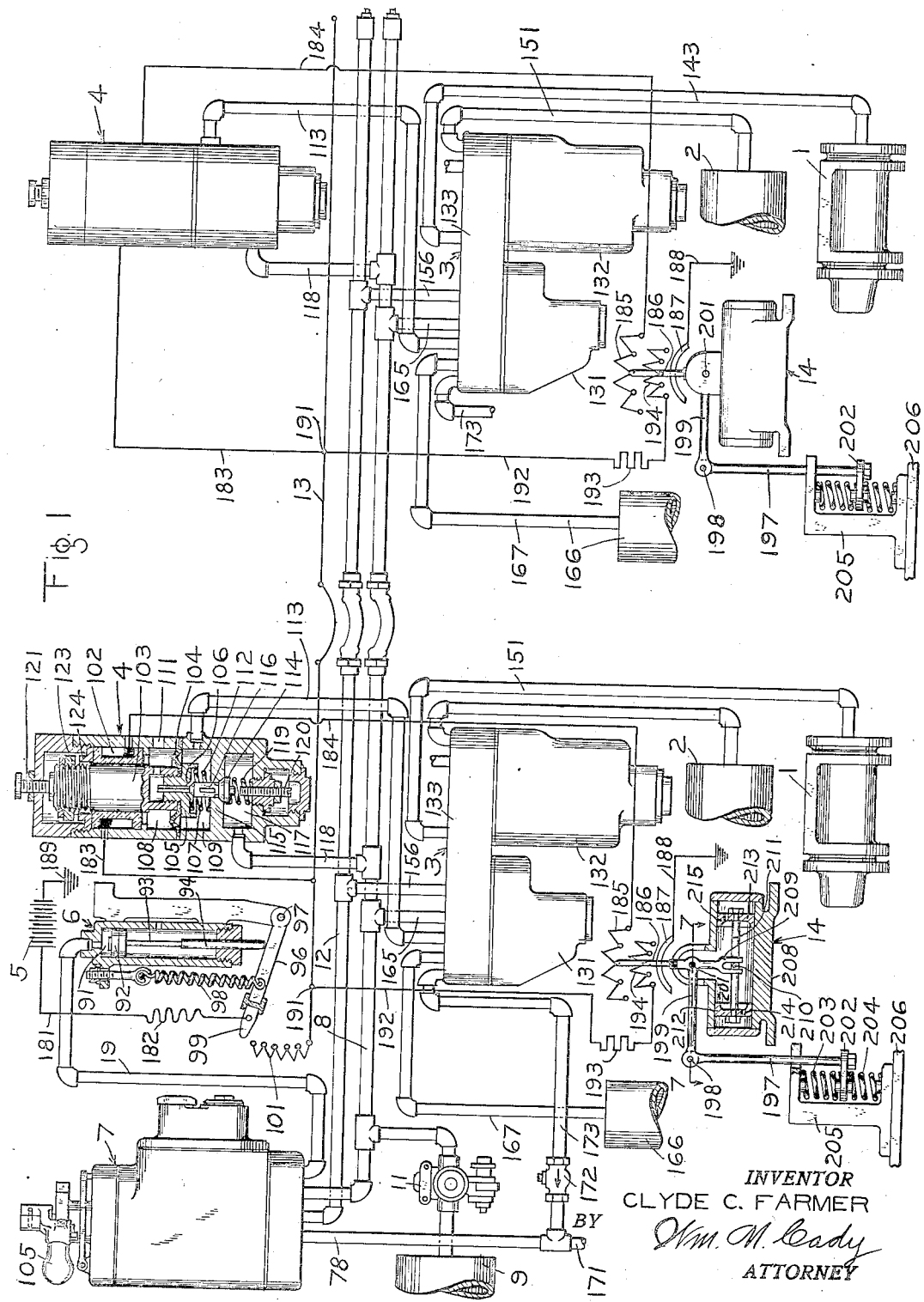
INVENTOR
CLYDE C. FARMER
BY Wm. M. Cady
ATTORNEY Dec. 17, 1935.  C. C. FARMER  2,024,687
ELECTROPNEUMATIC BRAKE
Filed July 7, 1934  3 Sheets-Sheet 2
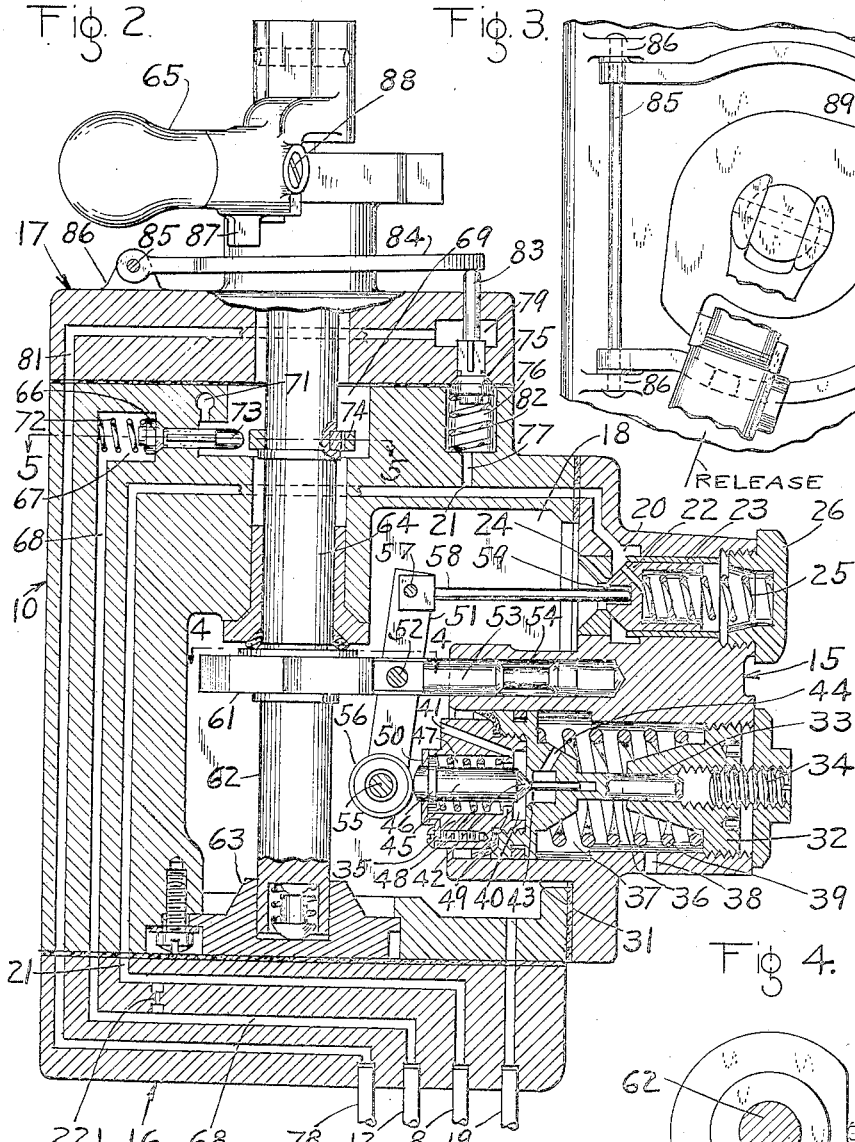
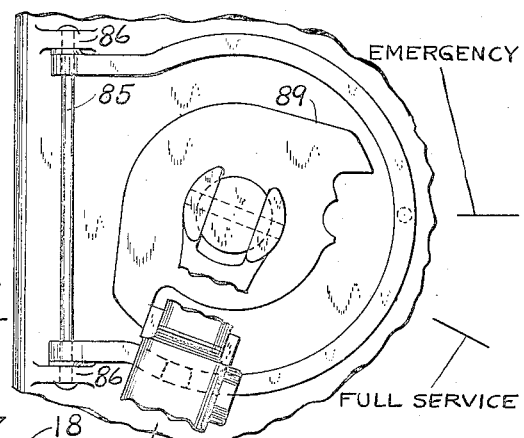
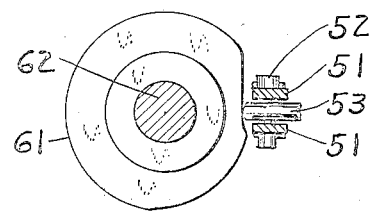
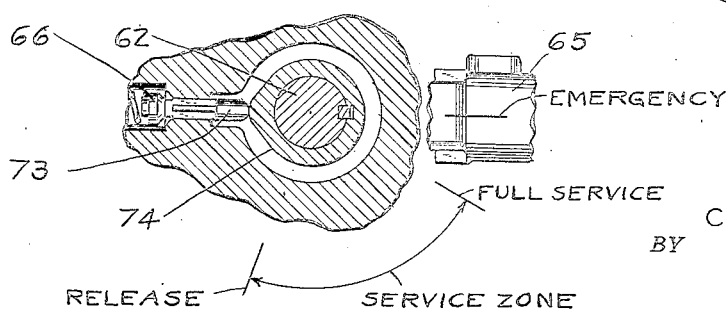
INVENTOR
CLYDE C. FARMER
BY Wm. M. Cady
ATTORNEY Dec. 17, 1935. C. C. FARMER 2,024,687
ELECTROPNEUMATIC BRAKE
Filed July 7, 1934  3 Sheets-Sheet 3

INVENTOR
CLYDE C. FARMER
BY Wm. M. Cady
ATTORNEY

Patented Dec. 17, 1935

2,024,687

UNITED STATES PATENT OFFICE 2,024,687

ELECTROPNEUMATIC BRAKE

Clyde C. Farmer, Pittsburgh, Pa., assignor to The Westinghouse Air Brake Company, Wilmerding, Pa., a corporation of Pennsylvania Application July 7, 1934, Serial No. 734,127

7 Claims. (Cl. 303—22)

My invention relates to electropneumatic brake equipment for vehicles and more particularly to such equipment for multiple unit railway trains in which means is provided for varying the braking pressure on the individual cars or trucks in accordance with the load thereon.

It is an object of my invention to provide a light weight brake equipment that is low in cost and simple in construction for use on multiple unit trains in which a uniform fast application and release of the brakes may be obtained on all cars or train units.

It is another object of my invention to provide a brake equipment which effects a uniform rate of retardation on all train units regardless of the loading thereon.

It is a further object of my invention to provide an electropneumatic brake equipment in which a magnet valve device is provided on each car or truck unit for controlling the supply of fluid under pressure to the brake cylinder and in which means is provided for varying the brake cylinder pressure in accordance with the load on the vehicle.

It is a further object of my invention to provide an electropneumatic brake equipment in which a pneumatic emergency brake application is available in the event of failure of the electrical equipment.

Figure 6:
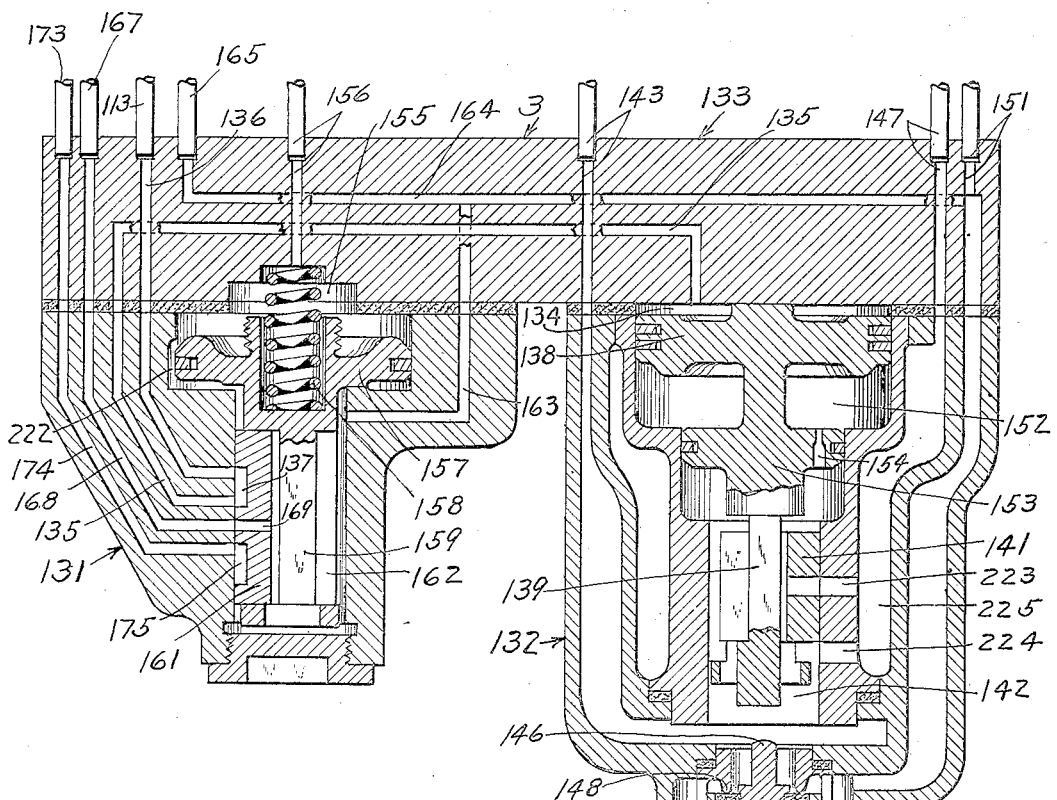
Figure 7:
Figure 8:
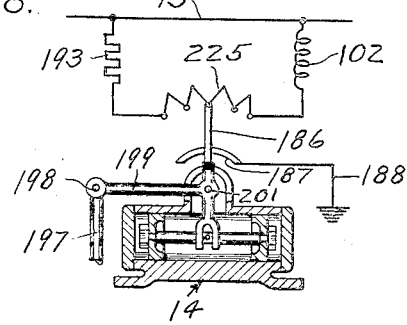

Other objects and advantages of my invention will be apparent from the following description of one preferred embodiment thereof taken in connection with the accompanying drawings in which Fig. 1 is a diagrammatic view illustrating circuits and apparatus comprising one preferred embodiment of my invention, Fig. 2 is a diagrammatic sectional view of the self-lapping brake valve device shown in Fig. 1, Fig. 3 is a plan view of a portion of the brake valve device shown in Fig. 2, Fig. 4 is a sectional view taken on the line 4—4 of Fig. 2, Fig. 5 is a sectional view taken on the line 5—5 of Fig. 2, Fig. 6 is a diagrammatic sectional view illustrating the control valve shown in Fig. 1, Fig. 7 is a view taken along the line 7—7 of Fig. 1, and Fig. 8 is a diagrammatic view illustrating a modified electric circuit.

Referring to the drawings, and more particularly to Fig. 1 thereof, in which brake apparatus is illustrated as employed on two train units, the apparatus comprises a brake cylinder 1 through which the brakes are applied in accordance with the flow of fluid under pressure from the supply reservoir 2 in accordance with the operation of a control valve device 3 that is governed in accordance with the operation of a self-lapping magnet valve device 4 adapted to be energized from a constant voltage source of electrical energy 5 and controlled by a pressure operated rheostat 6 in accordance with the operation of a self-lapping brake valve device 7.

A supply pipe 8 extends from the brake valve device 7 throughout the length of the train and is provided with branch pipe connections to the control valve devices 3 for supplying fluid under pressure to the respective supply reservoirs 2 on the individual train units. The supply pipe 8 is supplied with fluid under pressure from the main reservoir 9, carried on the first unit of the train at the reduced pressure as supplied by feed valve device 11. An emergency pipe 12 extends from the brake valve device 7 throughout the length of the train and is provided with branch pipes to the control valve devices 3 carried on each train unit. A train wire 13 extends from the pressure operated rheostat 6 throughout the length of the train for controlling the energization of the several self-lapping magnet valve devices 4, one of which is associated with each train unit. A variable load brake mechanism 14 is provided on each train unit, for adjusting the degree of energization of the self-lapping magnet valve 4 associated with that train unit, upon a particular operation of the pressure rheostat 6, in accordance with the load on that unit.

The brake valve device 7, best shown in Figs. 2, 3, 4, and 5, may correspond to United States application of Ewing K. Lynn and Rankin J. Bush, for Improvements in brake valve devices, Serial No. 569,158, filed October 16, 1931, and assigned to the same assignee as this application.

The brake valve device 7, best shown in Figs. 2, 3, 4, and 5, comprises a main body portion 10, a valve portion 15, a bracket portion 16, and a top or cover portion 17. The main body portion, the valve portion, and the bracket portion together define a pressure chamber 18 that is in open communication through the passage and pipe 19 with a pressure controlled rheostat 6. The valve portion 15 is provided with a supply valve chamber 20 that is in open communication through the passage 21 with the supply pipe 8. A supply valve 22 is contained within the supply valve chamber 20 and is slidably disposed within the bushing sleeve 23 to engage a seat 24 carried by the valve portion casing. The valve 22 is subject to the pressure of a spring 25, one end of which engages the valve, and the other end of which engages a nut 26 screw-threadedly attached within a bore in the valve portion casing.

The valve section 15 of the casing is also provided with a cylinder 31 which is open at one end to the pressure chamber 18, the other end of the cylinder being closed by an adjusting member 32 screw-threadedly attached within a bore in the casing section. The adjusting member 32 is provided with a central bore 33 which at its outer end is tapped to receive a screw-threaded cap member 34.

Operatively mounted in the cylinder 31, adjacent to its open end, is a movable abutment in the form of a piston 35 having a stem 36 which is slidably guided by the adjustable member 32 within the inner end of the bore 33. At one end of the piston 35 is a chamber 37 which is constantly open to the atmosphere through a passage 38. A coil spring 39 is contained in the chamber 37 and is interposed between and engages the inner face of the piston 35 and the inner face of the adjusting member 32.

A release valve chamber 40 is provided within the piston 35, and is in open communication with the pressure chamber 18 through a passage 41. A release valve 42 is contained within the valve chamber 40, and is adapted to seat on a valve seat 43 formed on the piston, and which is operative to control communication between the valve chamber 40 and the chamber 37, through connecting passage 44 in the piston stem 36. The release valve is provided with a stem 45 the smaller end of which slides within the bore in the stem of the piston 35, and the larger end of which is provided with a collar 46 which slidably engages the piston within a central bore 47 and is subject to the pressure of a release valve spring 48 interposed between and engaging the collar 46 and an annular flange 49 on the piston. Outward movement of the release valve relative to the piston 35 is limited by the collar 46 which engages a stop plate 50 that is secured to the piston 35. The outer end portion of the valve stem 45 extends through an opening in the stop plate 50 and beyond the face of the piston, and is adapted to be operatively engaged by a mechanism that will now be described.

A mechanism is provided for controlling the operation of the supply valve 22 and the release valve 42 comprising spaced levers 51 that are pivotally mounted intermediate their ends to a pin 52, supported in a plunger 53 that is slidably guided within a bore 54 in the casing section 15.

The lower ends of the spaced levers 51 are connected together by a pin 55, upon which is loosely mounted a roller 56 that is adapted to operatively engage the outer end of the release valve stem 45. The upper ends of the spaced levers 51 are connected together by a pin 57, on which one end of an operating rod 58 is pivotally mounted, the opposite end of the rod operatively engaging the supply valve 22 within a recess 59 formed in its face.

For the purpose of operating the plunger 53 a cam 61 is provided, having a peripheral face for engaging the end of the plunger 53 and mounted upon a shaft 62 that is supported by a step bearing 63 and a sleeve bearing 64, and that extends upwardly through the cover of the valve casing and is provided with an operating handle 65.

When the handle 65 and the cam 61 are in their release positions, as shown in Figs. 2, 3 and 4, the spring 25 forces the supply valve 22 to its seated position, and the spring 48 forces the release valve 42 toward the left, or to its unseated position. It will be appreciated that the force of the release valve spring 48 is less than the force of the supply valve spring 25, which is less than the force of the regulating spring 39. When the handle 65 is moved from release position the cam 61 forces the plunger 53 toward the right, the first portion of this movement effecting a compression of the spring 48 and the seating of the release valve 42, closing communication between the pressure chamber 18 and the atmosphere through passages 41, 44 and 38. Further movement of the plunger 53 toward the right causes the spaced levers 51 to pivot about their lower ends, further movement of the roller 56 toward the right being prevented by the regulating spring 39, and causes the rod 58 to force the supply valve 22 against the compression of the supply valve spring 25 to open communication between supply pipe 8 and the pressure chamber 18, through passage 21 and supply chamber 20, thus supplying fluid under pressure from supply pipe to the pipe 19 leading to the pressure control rheostat 6.

The amount of fluid under pressure supplied to the pressure chamber 18, and to the pipe 19, is dependent upon the degree of movement of the cam 61 from its release position, since while the pressure within the chamber 18 increases due to flow of air thereto through the supply valve 22 a pressure is exerted on the chamber side of the piston 35 in opposition to the pressure exerted by the regulating spring 39. This pressure continues to build up until it becomes sufficient to force the piston 35 toward the right, relieving the pressure on the roller 56 and permitting the supply valve spring 25 to force the rod 58 toward the left, pivoting the levers 51 about the pivot pin 52 and moving the supply valve 22 into engagement with its seat 24. The amount of pressure on the chamber side of the piston 35 necessary to effect sufficient movement of piston 35 to cause the supply valve 22 to seat is dependent upon the amount of movement of the handle 65 and of the cam 61 away from its release position. The greater the movement of the cam from its release position the greater will be the movement of the pivot pin 52 toward the right, and, consequently, the greater will be the compression of the regulating spring 39 necessary to permit movement of the levers 51, and of the rod 58 to effect the seating of the supply valve 22. It will be apparent therefore that the brake valve device is self-lapping on a pressure basis, the degree of pressure within the pressure chamber 18 and the pipe 19 necessary to effect lap operation of the valves being dependent upon the degree of movement of the handle 65 from its release position.

In order to provide for emergency operation of the brakes an emergency valve 66 is provided in an emergency valve chamber 67 located in the upper part of the main casing portion 14 for controlling communication between the emergency pipe 12, with which the emergency valve chamber 67 is in open communication through the passage 68, and the atmosphere through the exhaust chamber 69 and exhaust port 71. A spring 72 is provided in the emergency valve chamber that engages the emergency valve 66 urging it to its seated position. A valve stem 73 is provided for the valve 66 that extends through a bore between the emergency valve 76 chamber 67 and the exhaust chamber 69, and is positioned to be engaged by movement of a cam 74 positioned on the shaft 62, when the handle 65 is rotated to emergency position as best shown in Fig. 5, thus opening communication between the emergency pipe 12 and the atmosphere to effect an emergency operation of the brakes in a manner to be later explained.

A sanding valve 75 is provided within the sanding valve chamber 76 in the upper part of the casing structure that is in open communication with the supply pipe 8 through passages 77 and 21, and with the sanding pipe 78 through chamber 79 and passage 81. A spring 82 is provided in the sanding valve chamber for urging the sanding valve 75 to its seated position, and a valve stem 83 is provided that extends upwardly from the valve 75 through an opening in the cover portion of the casing, and beyond the face thereof, into engagement with an operating ring 84, pivotally supported by a hinged pin 85 that is carried by upwardly extending lugs 86. The operating ring 84 is adapted to be engaged by a finger 87 extending downwardly from the handle 65 which may be actuated about the pivot pin 88, and when so actuated presses the ring 84 and the valve stem 83 downwardly to effect communication between the supply pipe 8 past the sanding valve 75 to the sanding pipe 78. The usual notched plate 89 is provided for defining the several operative positions of the handle 65.

The pipe 19 connects the pressure chamber 18 within the brake valve device 7 to a piston chamber 91 within the pressure operated rheostat 6. A piston 92 is provided within the piston chamber 91, having a stem 93 that extends downwardly and engages a rod 94, which extends through an opening in a nut 95 in the lower end of the piston chamber cylinder, and which engages a rheostat arm 96 pivotally supported by a pin 97. The arm 96 is actuated by the pressure of the piston 92 acting against the pressure of a spring 98 to operate the rheostat contact member 99 into engagement with one of the contact members associated with the resistor 101 for varying the voltage applied to the train wire 13.

The self-lapping magnet valve 4 comprises an operating winding 102 and a core member 103 to the lower end of which a diaphragm 104 and a stem 105 are attached, the stem providing a valve seat 106 for a release valve 107 positioned within a release valve chamber 109 for controlling communication between the chamber 109 and an outlet chamber 108, that is connected to the atmosphere through outlet port 111. A spring 112 is provided within the release valve chamber 109 for urging the stem 105 and the core 103 upwardly to unseat the valve 107 and effect communication between the application and release pipe 113 connected to the control device 3 and the atmosphere. A valve 114 is provided in axial alignment with the valve 107 having a seat in a partition wall 115 of the casing, and is provided with an upwardly extending stem 116 which extends through a bore in said wall and engages the valve 107. The valve 114 controls communication between the application valve chamber 117 that is connected to the supply pipe 8 through the branch pipe 118, and the release valve chamber 109 that is connected to the application and release pipe 113. A spring 119 is provided within the chamber 117 for urging the valve 114 to its seat and a stop 120 is provided in the lower part of the casing structure to limit the downward movement of the valve 114. The upward movement of the core 103 is limited by a stop 121 in the form of a bolt inserted through the upper wall of the casing structure, and its downward movement is limited by a nut 123 screw-threadedly attached to the core and adapted to engage a flanged washer 124 attached to the casing.

Upon energization of the winding 102, the core 103 is moved downwardly bringing the seat 106 against the valve 107 to close communication between the release valve chamber 109 and the outlet chamber 108, and, upon further downward movement of the core, to force the valve 114 from its seat thus opening communication between the chamber 117 and the chamber 109. Fluid under pressure thus passes from the supply pipe 8 through branch pipe 118, chamber 117, chamber 109, application and release pipe 113, to effect application of the brakes. As fluid under pressure enters the chamber 109 the pressure of this fluid against the diaphragm 104 tends to urge the core 103 upwardly causing the valve 114 to seat when the pressure within the chamber 109 has become equal to or greater than the downward force of the magnet. The particular pressure at which the valve 114 will seat depends, therefore, upon the degree of energization of the winding 102.

The control valve device 3 comprises an emergency valve portion 131, a relay valve portion 132 and a pipe bracket portion 133. The relay valve portion comprises a casing having a chamber 134 normally connected to the application and release pipe 113 through passages 135, 136 and the cavity 137 in the emergency slide valve 161, and containing an application piston 138, which is adapted through the medium of a stem 139, to operate a slide valve 141, operatively connected to the stem and contained in a valve chamber 142, that is constantly connected to the brake cylinder 1 through a brake cylinder pipe 143. Also contained within the casing of the relay valve portion is a fluid pressure supply valve 144, that is subject to the pressure of a spring 145, and which is provided with a stem 146 that is adapted to be operatively engaged by the end of the piston stem 139.

The relay valve device is shown in its brake releasing position in which position the application piston 138 and the slide valve 141 are in their extreme upper or brake releasing positions. With the slide valve 141 in this position the valve chamber 142 and consequently the brake cylinder 1 is connected to the atmosphere through an exhaust passage and pipe 147. With the application piston 138 in release position the stem 139 will be out of engagement with the end of the supply valve stem 146 so that the pressure of the spring 145 will maintain the supply valve 144 seated against its rib seat 148, thereby maintaining communication closed from the chamber 149, that is constantly connected to the supply reservoir 2 through passage and pipe 151, to the valve chamber 142. A baffle piston 153 is provided on the piston stem 139 and defines a chamber 152 at the lower side of the application piston 138 that is in communication with the valve chamber 142 through a restricted passage 154. The baffle piston prevents changes in pressure within the valve chamber 142 from being too rapidly applied to the lower side of the application piston 138, which, under some conditions, might cause a pumping action of the relay valve.

The emergency valve portion comprises a casing having a chamber 155 that is in constant communication, through passage and pipe 156, with the emergency pipe 12, and that contains a piston 157 that is urged by a spring 158 to its lower or illustrated position. The piston is provided with a stem 159 that operatively engages an emergency slide valve 161, contained within a slide valve chamber 162 that is in constant communication with the supply pipe 8 through passages 163, 164 and branch pipe 165. In the release or illustrated position of the emergency piston 157 and valve 161, the release and application pipe 113 is in communication with the application piston chamber 134 of the relay valve device through groove 137 in the emergency valve 161, the sanding reservoir 166 is in communication with the valve chamber 162 through pipe 167, passage 168, and port 169 in the emergency valve 161. A sanding pipe 171 is adapted to be connected to the sanding reservoir 166 through a one-way check valve 172, pipe 173, passage 174 and cavity 175 in the emergency slide valve 161 when the valve is so positioned that the cavity 175 connects the passages 174 and 168.

Upon operation of the pressure controlled rheostat 6 to cause engagement of the contact member 99 with one of the contact members associated with the resistor 101 the train wire 13 is connected to the constant voltage source of electrical energy 5 through conductor 181, resistor 182, contact member 99 and a portion of the resistor 101. Operating circuits will now be completed from the train wire 13 through the windings 102 of the several self-lapping magnet valves associated with the train units. This circuit extends from the wire 13 through conductor 183, the winding 102 of the self-lapping magnet valve, conductor 184, resistor 185, and contact arm 186 of the load regulating device 14, contact segment 187, and conductor 188 to ground, and to the grounded terminal 189 of the source 5. In order to prevent an operation of the rheostat for varying the resistance 185, from changing the voltage between the train wire 13 and ground, a circuit is provided on each train unit between the train wire 13 and ground in shunt relation to the circuit of the winding 102 of the self-lapping magnet valve device 4. This circuit extends from the junction point 191 through conductor 192, a resistor 193 to a variable resistor 194, and by contact arm 186, segment 187 and conductor 188 to ground. The resistor 193 is designed to have the same resistance as the winding 102 of the self-lapping magnet valve and the resistors 185 and 194 are equal and provided with equal resistance steps. Consequently as the contact arm 186 is moved to the right or to the left the resistance dropped from one of the two pairs of circuits will be added to the other of the two pairs of circuits, and, since the resistor 193 and the winding 102 of the self-lapping magnet valve have equal resistance, the current flowing from the junction point 191 to ground through conductor 188 will be constant for any position of the arm 186 and for a given voltage between the train wire 13 and ground. The voltage between the train wire 13 and ground, and consequently the degree of energization of the winding 102 of the self-lapping magnet valve will therefore depend solely upon the position of the contact member 99 of the pressure rheostat 6 that determines the amount of the resistor 101 that is connected in circuit between the constant voltage source of supply 5 and the train wire 13.

The variable load brake mechanism 14 comprises a plunger 197 that is connected by a pivot pin 198 to one end of a bell crank lever 199 that is pivotally mounted on the pin 201 for operating the contact arm 186. The lower end of the plunger 197 is provided with an arm 202 that is subject on one side to the pressure of a spring 203, and, on the other side to the pressure of a spring 204, that engages the arm 202 and the upper and lower portions of the supporting structure 205 carried on the spring flange of the car truck 206. The variable load brake mechanism is also provided with a cylinder 208 mounted on the car body and upon which the bell crank lever 199 is supported. In order to maintain the plunger 197 in its position of adjustment according to the load on the car and against movement due to vibration of the car body with respect to the truck, the lever 199 is provided with a downwardly extending portion 209 that operatively engages a pin 210 carried by the rod 211 that is connected between pistons 212 and 213, within the casing 208, and provided, respectively, with restrictive ports 214 and 215 to enable the pistons to serve as retarding means for opposing movement of the bell crank lever.

In Fig. 8 of the drawings a modified arrangement of the circuits between the train wire 13 and ground is shown, in which the resistor 193 and the winding 102 of the self-lapping magnet valve device 4 are connected to opposite ends of a variometer resistor 225 to some point of which the movable contact arm 186 is connected, and which performs the same function as the resistors 185 and 194 shown in Fig. 1, namely, to vary the degree of energization of the operating winding 102 of the self-lapping magnet valve device 4 in accordance with the load on the car or train unit, without varying the flow of current between the train wire 13 and ground.

The several figures of the drawings illustrate the several parts of the equipment in brake releasing or charging position. In this position of the various parts of the equipment, the system may be charged by the flow of fluid under pressure from the main reservoir 9 through the feed valve 11 to the supply pipe 8. Fluid under pressure flows through the supply pipe 8 to the several train units, and, in each unit, through branch pipe 165 leading to the control valve device through passage 164 and pipe 151 to charge the supply reservoir 2. Fluid under pressure also flows from passage 164 into the chamber 149 of the supply valve device associated with the relay valve portion 132, and from the passage 164 through passage 163 to the emergency valve chamber 162. The sanding reservoirs 166 are charged by the flow of fluid under pressure from the emergency valve chamber 162 through port 169 in the emergency valve, passage 168, and sanding reservoir pipe 167. The emergency pipe 12 is charged by the flow of fluid under pressure from the supply pipe 8 through a restricted passage 221 in the bracket section of the brake valve device 7, thus charging the emergency piston chamber 155 from the emergency pipe 12 through branch pipe and passage 156. When the emergency piston 157 is in its lower or illustrated position, the piston chamber 155 and the valve chamber 162 are in communication through a restricted feed groove 222 around the piston 157, thus permitting the emergency piston chamber 155 to also be charged from the emergency valve chamber 162 unless the pressure differential between the valve chamber 162 and the piston chamber 155 becomes sufficient to cause the piston 157 to move upwardly against the downward pressure of the spring 158.

If the operator desires to apply the brakes, the brake valve handle 65 may be moved into any position within its service application zone, thus permitting fluid under pressure to pass from the supply pipe 8, past the supply valve 22, into the pressure chamber 18 within the brake valve device 7 until the pressure within the chamber 18, and within the chamber 91 of the pressure operated rheostat 6, builds up to a value dependent upon the degree of movement of the brake valve handle 65 from its release position in the manner hereinbefore described. The rheostat 6 is operated to move the contact member 99 downwardly into engagement with one of the contact members associated with the resistor 101, the degree of movement being dependent upon the amount of pressure within the piston chamber 91. This operation of the rheostat 6 causes the train wire 13 to become alive, the voltage between the train wire 13 and ground being dependent upon the amount of the resistance 101 that is in circuit between the constant voltage source 5 and the train wire 13, and thus controls the degree of energization of the windings 102 for operating the self-lapping magnet valve devices 4.

The degree of energization of the winding 102 is also determined in part by the position of the contact arm 186 on the resistor 185. When the car is unloaded the arm 186 is in its extreme left position thus including the entire resistance 185 in circuit with the winding 102 and effecting a lesser degree of energization of the winding for a particular voltage drop between the wire 13 and ground. If the car is loaded the additional weight causes the car body and the casing portion 208 to be lowered with respect to the car truck, thus effecting operation of the contact arm 186 toward the right an amount depending upon the degree of loading of the car. The winding 102 of the self-lapping magnet valve will therefore be energized an amount depending in part upon the loading of the car, the energization being greater for a heavily loaded car than for a lighter loaded car.

As explained above the amount of fluid under pressure admitted from the supply pipe 8 into the application and release pipe 113, through the application valve chamber 117 and the release valve chamber 109 of the self-lapping magnet valve device 4, is dependent upon the degree of energization of the winding 102. Fluid under pressure passes from the application and release pipe 113, through passage 136 in the control valve device, cavity 137 in the emergency valve 161, passage 135 to the application piston chamber 134 of the relay valve device, forcing the piston 138 together with its stem 139 downwardly until the end of the stem engages the stem 146 of the supply valve 144. As the slide valve 141 moves downwardly, the ports 223 and 224 providing communication between the valve chamber 142 and the chamber 225 and the exhaust pipe 147, are lapped, thus closing communication between the brake cylinder 1 and the atmosphere. Upon a further downward movement of the piston 138, and its stem 139, the supply valve 144 is unseated permitting the flow of fluid under pressure from the supply reservoir 2 through the supply reservoir pipe 151 to chamber 149, past the supply valve 144 into the slide valve chamber 142, and to the brake cylinder through the brake cylinder pipe 143, thus effecting an application of the brakes. As the pressure builds up in the slide valve chamber 142, the pressure on the under side of the application piston 138 and on the baffle piston 153 will also build up, the pressure in the chamber 152 building up more slowly than the pressure in the valve chamber 142 by virtue of the restricted port 152 through the baffle piston 153, thus preventing the relay valve device from pumping, first to a valve open and then to a valve closed position. When the pressure in the chamber 152 has built up to be equal to the pressure within the piston chamber 134 the piston stem 139 will be forced upwardly by the pressure of the spring 145 until the valve 144 engages its rib seat 148, after which there will be no further upward pressure of the valve stem 146 against the piston stem 139. The relay slide valve 141 will then be in lap position with the fluid under pressure within the brake cylinder at a pressure corresponding to the pressure within the application piston chamber 134.

Should the operator desire an emergency operation of the braking equipment, the handle 65 is moved to its emergency position, thus effecting operation of the cam 74 into engagement with the emergency valve stem 73 to move the emergency valve 66 from its seat against the bias of the spring 72 as shown in Fig. 5. Fluid under pressure is then vented from the emergency pipe 12 through passage 68, emergency valve chamber 67, past the emergency valve into the exhaust chamber 69, and through the exhaust passage 71 to the atmosphere, causing the pressure in the emergency piston chamber 155 to be rapidly reduced. This reduction in pressure within the emergency valve piston chamber 155 takes place at too rapid a rate to permit the chamber 155 from being charged through the feed groove 222 around the piston, thus creating a high differential in pressure between the valve chamber 162 and the chamber 155 and operating the piston 157 upwardly against the pressure of the spring 158. This upward movement of the emergency piston 157 causes the emergency slide valve 161 to move upwardly until the port 169 in the valve registers with the passage 135 leading to the application piston chamber 134 of the relay valve, thus directly connecting the piston chamber 134, through the emergency valve chamber 162 and passages 163, 164 and pipe 165, to the supply pipe 8 to bring the pressure within the chamber 134 up to the supply pipe pressure. The application piston 138 and the piston stem 139 are thus forced downwardly to cause operation of the supply valve 144 to effect communication between the brake cylinder 1 and the supply reservoir 2 until the pressure in the brake cylinder has been built up to the full reservoir pressure.

When the emergency valve 161 is moved to emergency position, communication is established between the sanding reservoir 166 on the first train unit and the sanding pipe 171 through the cavity 175 in the emergency valve that is positioned to connect the passages 174 and 168. In the same manner fluid under pressure is supplied to sanding devices on other train units from the sanding reservoir 166 associated with the unit, through the emergency valve and sanding pipe 173.

If the operator wishes to sand the tracks while the brake valve handle 65 is in other than emergency position, this may be effected by forcing the handle 65 downwardly causing the finger 87 to engage the operating ring 84 that is in engagement with the stem 83 of the sanding valve 75 thus forcing the sanding valve 75 from its seat and permitting the flow of fluid under pressure from the supply pipe 8 through passages 21, 77, 81 and pipe 78 to the sanding pipe 171.

It will be understood from the above description that for all positions of the brake handle 65 within its service application zone the degree of braking of the train is dependent upon the positioning of the handle which controls the degree of energization of the winding 102 of the self-lapping magnet valve devices 4 and that the energization of the individual self-lapping magnet valve on the individual car units of the train is also determined in part by the position of the variable load control mechanism 14 that is dependent upon the loading of the individual car, thus effecting a greater brake cylinder pressure for a heavily loaded car than for a lightly loaded car to effect a substantially constant rate of retardation of the several cars independently of their loading.

While I have illustrated and described one preferred embodiment of my invention, it will be apparent to those skilled in the art that many modifications thereof may be made within the spirit of my invention and I do not wish to be limited otherwise than by the scope of the appended claims.

Having now described my invention, what I claim as new and desire to secure by Letters Patent, is:

1. In an electropneumatic brake equipment for multiple unit railway trains, in combination, a brake cylinder for each unit, electroresponsive means operable for controlling the supply of fluid under pressure to, and the release of fluid under pressure from, said brake cylinder in accordance with the degree of energization thereof, of manually operable control means operative in accordance with its position within a service application zone for effecting varying degrees of energization of the electroresponsive means, and means responsive to the load on each unit for effecting a relatively greater application of the brakes for a relatively heavier load on that unit only.

2. In an electropneumatic brake equipment for multiple unit railway trains, in combination, a brake cylinder for each unit, electroresponsive means operable for controlling the supply of fluid under pressure to, and the release of fluid under pressure from, said brake cylinder in accordance with the degree of energization thereof, of manually operable control means operative in accordance with its position within a service application zone for effecting varying degrees of energization of the electroresponsive means, resistor means associated with each electroresponsive means, and means for decreasing the resistance of said resistor means in accordance with increasing load on the unit to effect a greater degree of application of the brakes on the unit for a given operation of the manually operable means.

3. In a brake equipment for multiple unit railway trains, a brake cylinder associated with each unit, valve means associated with each brake cylinder for controlling the flow of fluid under pressure to and from the brake cylinder, electrical means for controlling said valve means, and resistor means in series circuit relation with said electrical means and responsive to the load on the unit for modifying a condition of the operating circuit only of said electrical means.

4. In a brake equipment for multiple unit railway trains, braking means associated with each unit, electrical means associated with each train unit for controlling the operation of said braking means, and means responsive to the load on each unit for modifying an operative condition of the operating circuit only of the electrical means associated with that unit.

5. In a brake equipment for multiple unit railway trains, in combination, braking means associated with each train unit, electrical means for each unit for controlling the operation of said braking means and operable to effect a degree of application of the brakes in accordance with the voltage impressed thereon, and resistor means in circuit with said electrical means and responsive to the load on said unit for effecting the application of an increasing voltage only on the electrical means of the associated unit as the load on the vehicle increases.

6. In a fluid pressure brake, in combination, electroresponsive means operative to supply fluid under pressure to effect an application of the brakes, a manually operable self-lapping brake valve device for controlling the energization of said electroresponsive means in accordance with its position within an application zone to effect a desired degree of application of the brakes, and means for controlling the degree of energization of said electroresponsive means in accordance with the load on the vehicle.

7. In a fluid pressure brake, the combination with electroresponsive means operative according to the degree of energization thereof for controlling the supply of fluid under pressure for effecting an application of the brakes, of fluid pressure controlled means for varying the degree of energization of said electroresponsive means, manually controlled means for varying the fluid pressure on said fluid pressure controlled means, and means responsive to the load on the vehicle for also varying the degree of energization of said electroresponsive means.

CLYDE C. FARMER